(12) United States Patent
Fukasawa et al.

(10) Patent No.: US 7,311,978 B2
(45) Date of Patent: Dec. 25, 2007

(54) PRIMER FOR VULCANIZATION BONDING

(75) Inventors: Kiyofumi Fukasawa, Fujisawa (JP); Tomohiro Kaise, Fujisawa (JP)

(73) Assignee: NOK Corporation, Tokyo (JP)

( * ) Notice: Subject to any disclaimer, the term of this patent is extended or adjusted under 35 U.S.C. 154(b) by 302 days.

(21) Appl. No.: 10/545,204

(22) PCT Filed: Aug. 27, 2003

(86) PCT No.: PCT/JP03/10830

§ 371 (c)(1),
(2), (4) Date: Aug. 9, 2005

(87) PCT Pub. No.: WO2005/023949

PCT Pub. Date: Mar. 17, 2005

(65) Prior Publication Data

US 2006/0251908 A1    Nov. 9, 2006

(51) Int. Cl.
*B32B 9/04* (2006.01)
(52) U.S. Cl. ............ 428/447; 106/287.16; 106/287.17; 106/287.18; 106/287.19; 428/448; 428/450; 428/689; 428/702; 524/858; 524/869
(58) Field of Classification Search .................... None
See application file for complete search history.

(56) References Cited

U.S. PATENT DOCUMENTS 5,985,371 A    11/1999  Fujioka et al.
2005/0288474 A1 *  12/2005  Matsuda et al. ............. 528/32

FOREIGN PATENT DOCUMENTS

| JP | 54-119597 A | * | 9/1979 |
|---|---|---|---|
| JP | 57-149371 A |   | 9/1982 |
| JP | 57-149372 A |   | 9/1982 |
| JP | 6-136343    |   | 5/1994 |
| JP | 6-228525 A  |   | 8/1994 |
| JP | 7-34054 A   | * | 2/1995 |
| JP | 07-034054   |   | 3/1995 |
| JP | 07-216309   |   | 8/1995 |
| JP | 08-209102   |   | 8/1996 |
| JP | 09-003432   |   | 1/1997 |
| JP | 09-040916   |   | 2/1997 |
| JP | 09-132758   |   | 5/1997 |
| JP | 10-007990   |   | 1/1998 |
| JP | 10-008021   |   | 1/1998 |
| JP | 10-219197   |   | 8/1998 |
| JP | 11-001672   |   | 1/1999 |
| JP | 2000-272045 A |  | 10/2000 |
| JP | 2001-226641 |   | 8/2001 |
| WO | WO 02/24826 |   | 3/2002 |

* cited by examiner

*Primary Examiner*—Marc S. Zimmer
(74) *Attorney, Agent, or Firm*—Butzel Long

(57) ABSTRACT

A primer for vulcanization bonding, which comprises a copolymerization copolymer of amino group-containing alkoxysilane and vinyl group-containing alkoxysilane, and an organometallic compound, can give a metal-rubber composite having a water-resistant adhesiveness equivalent or superior to that of coating type chromate processing agent, without application of harmful coating type chromate processing to a metal, and thus can be effectively used in surface treatment of metals such as stainless steel, etc. for the production of seal products of rubber-bonded metal (e.g. oil seals, packings and gaskets), valves, vibration-controlled or vibration damped products (e.g. vibration-controlled steel sheets and vibration-damped rubber), industrial rubber products, etc.

3 Claims, No Drawings

PRIMER FOR VULCANIZATION BONDING

TECHNICAL FIELD

The present invention relates to a primer for vulcanization bonding, and more particularly to a primer for vulcanization bonding effective for forming a metal-rubber composite with a distinguished water-resistant adhesiveness.

BACKGROUND ART

Stainless steel is much used in the formation of a metal-rubber composite requiring resistances to water or LLC (long life coolant), but when a vulcanization adhesive is directly applied to stainless steel, and when rubber is vulcanization bonded thereto, the resulting stainless steel-rubber composite has poor resistances to water or LLC, and bond peeling occurs, when the composite is subjected to a dipping test.

To overcome such problems, a coating type chromate processing is applied to the stainless steel as a pretreatment to the application of a vulcanization adhesive, thereby improving the resistances to water or LLC. However, the coating type chromate processing involves Cr ions and thus is not preferable from the viewpoint of environmental pollution.

The present applicant has so far proposed various vulcanization adhesive compositions based on alkoxysilanes (JP-A-7-34054, JP-A-7-216309, JP-A-8-209102, JP-A-9-3432, JP-A-9-40916, JP-A-9-132758, JP-A-10-7990, JP-A-10-8021, JP-A-11-1672 and JP-A-2001-226642). These vulcanization adhesive compositions are particularly suitable for bonding to metal surfaces, which have been subjected to chemical, electrochemical or physical surface treatments in advance, but when applied to untreated metal surfaces, the resulting adhesiveness is not better than that of the stainless steel that has been subjected to, e.g. coating type chromate processing.

An under coats for various vulcanization adhesives based on phenol resin are commercially available, but have failed to show satisfactory adhesiveness and water resistance in the bonding to stainless steel.

DISCLOSURE OF THE INVENTION

An object of the present invention is to provide a primer for vulcanization bonding capable of forming a metal-rubber composite with a distinguished water-resistant adhesiveness, without application of harmful coating type chromate processing, etc. to metals, in forming composites of metals such as stainless steel, etc. and rubber.

Such an object of the present invention can be attained by a primer for vulcanization bonding, which comprises a copolymerization oligomer of an amino group-containing alkoxysilane and a vinyl group-containing alkoxysilane, and an organometallic compound.

Amino group-containing alkoxysilanes as one member of the copolymerization oligomer for use in the present invention include, for example, γ-aminopropyltriethoxysilane, γ-aminopropyltrimethoxysilane, N-β-(aminoethyl)-γ-aminopropyltrimethoxysilane, N-β-(aminoethyl)-γ-aminopropyltriethoxysilane, etc. When these amino group-containing alkoxysilanes are used as they are as one component of the adhesive composition, no satisfactory films are formed, so no satisfactory adhesives can be obtained, and thus they are used as copolymerization oligomers with vinyl group-containing alkoxysilanes.

Vinyl group-containing alkoxysilanes as another counterpart member for use in the present invention include, for example, vinyltrimethoxysilane, vinyltriethoxysilane, etc. These vinyl group-containing alkoxysilane are sparingly soluble in water, easily separated as an oil phase, and immiscible with other components. Their oligomers are also sparingly soluble in water to form precipitates, so they are used as oligomers with amino group-containing alkoxysilanes.

In the oligomerization reaction, 25 to 400 parts by weight, preferably 50 to 150 parts by weight, of vinyl group-containing alkoxysilane and 20 to 150 parts by weight of water for hydrolysis are used on the basis of 100 parts by weight of amino group-containing alkoxysilane. In case of more than 400 parts by weight of vinyl group-containing alkoxysilane, the compatibility with a top coat or rubber will be deteriorated, resulting in poor adhesive-ness, whereas in case of less than 25 parts by weight the water resistance will be lowered.

The oligomerization reaction can be carried out by charging these components into a reactor provided with a distillation apparatus and a stirrer, stirring the charge at about 60° C. for about one hour; then adding thereto about 1 to about 2 moles of acid, for example, formic acid or acetic acid on the basis of one mole of amino group-containing alkoxysilane within one hour, while keeping the reactor temperature at about 65° C.; further continuing the stirring for 1 to 5 hours to proceed with the reaction, while distilling off alcohol formed by hydrolysis under reduced pressure discontinuing the distillation when the distillate turns only to water; and then adjusting the silane concentration to 30 to 80 wt. % by dilution, thereby obtaining the desired copolymerization oligomer. The copolymerization oligomer is soluble in an alcoholic organic solvent such as methanol, ethanol, etc. So far commercially available copolymerization oligomers can be used as such.

Use of amino/vinyl groups-containing alkoxysilane copolymerization oligomers in bonding between a metal such as stainless steel, etc. and fluoroelastomer was proposed by the present applicant (WO 02/24826), where the copolymerization oligomers were used as a vulcanization adhesive, whereas in the present invention the copolymerization oligomer is used as a primer for vulcanization bonding, requiring a vulcanization adhesive additionally.

The organometallic compound for use in the present invention includes, for example, organoaluminum compounds such as triisopropoxy aluminum, mono-sec-butoxy-dipropoxy aluminum, tri-sec-butoxy aluminum, ethylacetoacetate aluminum diisopropylate, aluminum tris (ethylacetoacetate), aluminum monoacetylacetonate bis (ethylacetoacetate), aluminum tris(acetylacetate), etc.; organotitanium compounds such as tetraisopropoxy titanium, tetra-n-butoxy titanium, isopropoxy titanium bis(ethyacetoacetate). 1,3-propanedioxy titanium bis(ethylacetoacetate), diisopropoxy titanium bis(acetylacetonate), titanium tetraacetylacetonate, etc.; organozirconium compounds such as tetra-n-propyl zirconium, tetra-n-butoxy zirconium, di-n-butoxy zirconium bis(acetylacetonate), di-n-butoxy zirconium bis(ethyl-acetoacetate), ect.; and organotin compounds such as dibutyl tin dioctanoate etc.

The organometallic compound is used in a proportion of about 10 to about 100 parts by weight, preferably about 40 to about 80 parts by weight on the basis of 100 parts by weight of the copolymerization oligomer. Below about 10 parts by weight, the water resistance will be lowered, whereas above about 100 parts by weight the compatibility with a top coat or rubber will be deteriorated, resulting in poor adhesiveness.

The present primer for vulcanization bonding comprising the aforementioned components as essential ones is used usually as an about 0.2 to about 3 wt. % solution in a mixed solvent of an alcoholic organic solvent such as methanol, ethanol, isopropanol, etc., or a ketonic organic solvent such as acetone, methyl ethyl ketone, etc., and water. The organic solvent and the water are used upon mixing in a ratio of the former to the latter of about 100 to about 80 wt. % to about 0 to about 20 wt. %. In case of using water as the counter part solvent, the molecular weight of the copolymerization oligomer will be higher to form a tough film. When the stability with time of the present primer for vulcanization bonding is required, it is effective to add an organic or inorganic acid thereto.

The present primer for vulcanization bonding is applied onto such a metal as stainless steel, mild steel, copper, magnesium, aluminum, aluminum die cast, etc. by dipping, spraying, brush coating, roll coating, etc. and dried at room temperature at first, and then at about 100° to about 200° C. for about 5 to about 10 minutes. Usually, a vulcanization adhesive selected in view of the species of rubber to be bonded to a metal is applied as a top coat onto the primer for vulcanization bonding formed to a film thickness of about 0.1 to about 10 µm as an under coat, and subjected to a baking treatment. Then, an unvulcanized rubber compound is bonded thereto and vulcanized at a vulcanization temperature depending on the species of rubber and, if necessary, under pressure. The unvulcani-zed compound can be also dispersed into an organic solvent and used as a rubber solution for coating.

The rubber to be bonded to a metal includes, for example, fluoroelastomer, NBR, hydrogenated NBR, acrylic rubber, chloroprene rubber, etc. and is used as an unvulcanized rubber compound upon compounding with a vulcanizing agent, a reinforcing agent, and other necessary compounding agents. Vulcanization bonding can be carried out only after the present primer treatment without any top coat application, depending on the species of unvulcanized compounds.

As to fluoroelastomer, any one of polyol-vulcanizable elastomers and peroxide-vulcanizable elastomers can be used. For unvulcanized fluoroelastomer compounds, for example, the following compounding formulation can be given.

(Compounding Formulation I)

|  | Parts by weight |
|---|---|
| Fluoroelastomer (Viton E45, a product of DuPont) | 100 |
| Calcium metasilicate | 40 |
| MT carbon black | 2 |
| Magnesium oxide (Magnesia #150, a product of Kyowa Kagaku K.K.) | 6 |
| Calcium hydroxide | 3 |
| Vulcanizing agent (Curative #30, a product of DuPont) | 2 |
| Vulcanization accelerator (Curative #20, a product of DuPont) | 1 |

(Compounding Formulation II)

|  | Parts by weight |
|---|---|
| Fluoroelastomer (Daiel G901, a product of Daikin Industries, Ltd.) | 100 |
| Calcium metasilicate | 20 |
| MT carbon black | 20 |
| Magnesium oxide (Magnesia #150) | 6 |
| Calcium hydroxide | 3 |
| Triallyl isocyanurate | 1.8 |
| Organic peroxide (Perhexa 25B, a product of NOF Corp.) | 0.8 |

Typical polyol-vulcanizable fluoroelastomers are normally copolymers of vinylidene fluoride with at least one of other fluorine-containing olefins such as hexafluoropropene, pentafluoropropene, tetrafluoroethylene, trifluorochloroethylene, vinyl fluoride, perfluoro(methyl vinyl ether), etc., and these fluoroelastomers can undergo polyol-vulcanization by a polyhydroxy-aromatic compound such as 2,2-bis(4-hydroxyphenyl)propane, 2,2-bis(4-hydroxyphenyl)perfluoropropane, hydroquinone, etc.

Typical peroxide-vulcanizable fluoroelastomers are normally fluoroelastomers having iodine(s) and/or bromine(s) in the molecules and can undergo vulcanization (cross-linking) by an organic peroxide usually used in the peroxide vulcanization, where it is preferable to use a polyfunctional unsaturated compound, typically, triallyl isocyanurate, together with the organic peroxide.

As NBR or hydrogenated NBR, any one of those vulcanizable or cross-linkable by a sulfur-based vulcanizing agent such as sulfur, tetramethylthiuram monosulfide, etc., or by a peroxide-based cross-linking agent can be used. As an unvulcanized nitrile rubber compound of peroxide crosslinking series, the nitrile rubber compound as given, for example, in the following Compounding Formulation III can be used. As an unvulcanized nitrile compound of sulfur vulcanization series, the nitrile rubber compound as given, for example, in Compounding Formulation IV can be used.

(Compounding Formulation III)

|  | Parts by weight |
|---|---|
| NBR (middle-high nitrile content, N237, a product of JSR Co.) | 100 |
| HAF carbon black | 10 |
| SRF carbon black | 40 |

-continued

| | Parts by weight |
|---|---|
| Cellulose powder | 10 |
| Zinc oxide | 10 |
| Stearic acid | 1 |
| Microcrystalline wax | 2 |
| Antioxidant (ODA-NS, a product of Ouchi Shinko Kagaku K.K.) | 4 |
| Plastisizer (Bucanol OT, a product of Bayer) | 5 |
| Organic peroxide (Perhexa 25B, a product of NOF Corp.) | 6 |
| N,N-m-phenylene dimaleimide | 1 |

(Compounding Formulation IV)

| | Parts by weight |
|---|---|
| NBR (DN402; CN23%, a product of Nippon Zeon Co., Ltd.) | 100 |
| SRF carbon black | 93 |
| Plastisizer (DOP) | 15 |
| Zinc oxide | 3 |
| Stearic acid | 1 |
| Antioxidant (Nocrack 224, a product of Ouchi Shinko Kagaku K.K.) | 1 |
| Antioxidant (Nokceller M, a product of Ouchi Shinko Kagaku K.K.) | 1 |
| Antioxidant (Nokceller TT, a product of Ouchi Shinko Kagaku K.K.) | 3 |
| Antioxidant (Nokceller PZ, a product of Ouchi Shinko Kagaku K.K.) | 0.8 |
| Sulfur | 0.5 |

Compounding formulation of acrylic rubber and chloroprene rubber are as follows:

(Compounding Formulation V)

| | Parts by weight |
|---|---|
| Active chlorine-containing acrylic rubber (PA402, a product of Unimatec Co.) | 100 |
| HAF carbon black | 40 |
| Powdery silica | 2 |
| Microcrystalline wax | 6 |
| Stearic acid | 3 |
| 4,4'-bis(2,2'-dimethylbenzyl)diphenylamine | 2 |
| Sulfur | 1 |
| Sodium stearate | 3.5 |

(Compounding Formulation VI)

| | Parts by weight |
|---|---|
| Chloroprene rubber (DCR-31, a product of, Denka Co.) | 100 |
| HAF carbon black | 50 |
| Zinc oxide | 5 |
| Magnesium oxide (#150) | 4 |
| Antioxidant (3C, a product of Kawaguchi Kagaku K.K.) | 3 |
| Antioxidant (ODA-NS, a product of Ouchi Shinko Kagaku K.K.) | 3 |
| Paraffin wax | 2 |
| Plastisizer (DIDA) | 15 |
| Antioxidant (Nokceller TT, a product of Ouchi | 2 |

-continued

| | Parts by weight |
|---|---|
| Shinko Kagaku K.K.) | |
| Vulcanization accelerator (Accel 22, a product of Kawaguchi Kagaku K.K.) | 2 |

BEST MODES FOR CARRYING OUT THE INVENTION

The present invention will be described below, referring to Examples.

Reference Example 1

40 parts by weight of γ-aminopropyltriethoxysilane and 20 parts by weight of water were charged into a three-necked flask provided with a stirrer, a heating jacket and a dropping funnel, and the pH was adjust to 4-5 with acetic acid, followed by stirring for a few minutes. 40 parts by weight of vinyltriethoxysilane was slowly dropwise added thereto through the dropping funnel with stirring. After the dropwise addition, heating and refluxing were carried out at about 60° C. for 5 hours, followed by cooling to room temperature to obtain copolymerization oligomer A.

Reference Example 2

In Reference Example 1, the amount of γ-aminopropyltriethoxysilane was changed to 64 parts by weight, and that of vinyltriethoxysilane was also changed to 16 parts by weight to obtain copolymerization oligomer B.

Reference Example 3

In Reference Example 1, the amount of γ-aminopropyltriethoxysilane was changed to 16 parts by weight, and that of vinyltriethoxysilane was changed to 64 parts by weight to obtain copolymerization oligomer C.

Reference Example 4

In Reference Example 1, the same amount of γ-aminopropyltrimethoxysilane was used in place of γ-aminopropyltriethoxysilane to obtain copolymerization oligomer D.

Example 1

| | Parts by weight |
|---|---|
| Copolymerization oligomer A | 2.5 |
| Titanium tetra(acetylacetonate) | 1.0 |
| Methanol | 86.5 |
| Water | 10.0 |

The foregoing components were mixed together and stirred for a few minutes to prepare a primer for vulcanization bonding.

The primer for vulcanization bonding was applied to a defatted SUS304 test pieces, air dried at room temperature, and then subjected to a baking treatment at 190° C. for 10 minutes. After cooling, the following vulcanization adhesives A, B, C were applied thereto as top coats, respectively, and air dried at room temperature. Then, a baking treatment was carried out at 150° C. for 10 minutes for top coats A and C. As to top coat B, only air dried one was used without the baking treatment.

Top coat A: Thixon 715, a product of Rohm & Haas Co.
Top coat B: Chemlok 220, a product of Lord Far East Co.
Top coat C: Metaloc XN-870, a product of Toyo Kagaku Kenkyusho K.K.

Vulcanization bonding was carried out by placing the unvulcanized rubber compounds (the afore-mentioned Compounding Formulations I, III and IV) on the treated test pieces, respectively, followed by press vulcanization at 180° C. for 6 minutes.

Example 2

In Example 1, the same amount of copolymerization oligomer B was used in place of copolymerization oligomer A.

Example 3

In Example 1, the same amount of copolymerization oligomer C was used in place of copolymerization oligomer A.

Example 4

In Example 1, the same amount of copolymerization oligomer D was used in place of copolymerization oligomer A.

Example 5

In Example 1, the same amount of di-n-butoxy zirconium bis(ethylacetoacetate) was used as an organometallic compound.

The adhesion test pieces obtained in the foregoing Examples were subjected to determination of percent retained rubber area (%) by a method according to JIS K-6256 90° peeling test procedure. The results are shown in the following Table 1.

TABLE 1

| | Example No. | | | | |
|---|---|---|---|---|---|
| Time of determination | 1 | 2 | 3 | 4 | 5 |
| [Fluoroelastomer] (Compounding formulation I, top coat C) | | | | | |
| Initial | 100 | 100 | 100 | 100 | 100 |
| After dipping in hot water at 80° C. for 70 hours | 100 | 100 | 100 | 100 | 100 |
| After dipping in hot water at 80° C. for 140 hours | 100 | 100 | 100 | 100 | 100 |
| After dipping in hot water at 80° C. for 280 hours | 100 | 100 | 100 | 100 | 100 |
| [NBR] (Compounding formulation III, top coat A) | | | | | |
| Initial | 100 | 100 | 100 | 100 | 100 |
| After dipping in hot water at 80° C. for 70 hours | 100 | 100 | 100 | 100 | 100 |
| After dipping in hot water at 80° C. for 140 hours | 100 | 100 | 100 | 100 | 100 |
| After dipping in hot water at 80° C. for 280 hours | 100 | 100 | 100 | 100 | 100 |
| (Compounding formulation IV, top coat B) | | | | | |
| Initial | 100 | 100 | 100 | 100 | 100 |
| After dipping in hot water at 80° C. for 70 hours | 100 | 100 | 100 | 100 | 100 |
| After dipping in hot water at 80° C. for 140 hours | 95 | 90 | 95 | 100 | 100 |
| After dipping in hot water at 80° C. for 280 hours | 90 | 90 | 90 | 90 | 90 |
| [Acrilic rubber] (Compounding formulation V, top coat A) | | | | | |
| Initial | 100 | 100 | 100 | 100 | 100 |
| After dipping in hot water at 80° C. for 70 hours | 100 | 100 | 100 | 100 | 100 |
| After dipping in hot water at 80° C. for 140 hours | 100 | 100 | 100 | 100 | 100 |
| After dipping in hot water at 80° C. for 280 hours | 100 | 100 | 100 | 100 | 100 |
| [Chloroprene rubber] (Compounding formulation VI, top coat B) | | | | | |
| Initial | 100 | 100 | 100 | 100 | 100 |
| After dipping in hot water at 80° C. for 70 hours | 95 | 90 | 95 | 100 | 95 |
| After dipping in hot water at 80° C. for 140 hours | 90 | 90 | 90 | 90 | 95 |
| After dipping in hot water at 80° C. for 280 hours | 80 | 80 | 85 | 85 | 80 |

Comparative Example 1

In Example 1, no organometallic compound was used.

Comparative Example 2

In Example 1, no primer for vulcanization bonding was used.

Comparative Example 3

In Example 1, a commercially available phenol resin-based primer adhesive (Metaloc PA-3375, a product of Toyo Kagaku Kenkyusho K.K.) was used as a primer for vulcanization bonding.

Comparative Example 4

In Example 1, a commercially available silane-based primer adhesive (Chemlok AP-133, a product of Lord Far East Co.) was used as a primer for vulcanization bonding.

Comparative Example 5

In Example 1, a commercially available coating type chromate processing agent (Zinchrom ZM-1415A, a product of Nihon Parkerizing Co.) was used as a primer for vulcanization bonding.

The adhesion test pieces obtained in the foregoing Comparative Examples 1 to 5 were subjected to determination of percent retained rubber area (%) by a method according to JIS K-6256 90° peeling test procedure. The results are shown in the following Table 2.

TABLE 2

| Time of determination | Comparative Example No. | | | | |
|---|---|---|---|---|---|
| | 1 | 2 | 3 | 4 | 5 |
| [Fluoroelastomer] (Compounding formulation I, top coat C) | | | | | |
| Initial | 100 | 0 | 70 | 100 | 100 |
| After dipping in hot water at 80° C. for 70 hours | 60 | 0 | 50 | 60 | 100 |
| After dipping in hot water at 80° C. for 140 hours | 30 | 0 | 0 | 40 | 100 |
| After dipping in hot water at 80° C. for 280 hours | 0 | 0 | 0 | 20 | 100 |
| [NBR] (Compounding formulation III, top coat A) | | | | | |
| Initial | 100 | 100 | 50 | 100 | 100 |
| After dipping in hot water at 80° C. for 70 hours | 60 | 30 | 20 | 40 | 100 |
| After dipping in hot water at 80° C. for 140 hours | 30 | 0 | 0 | 20 | 100 |
| After dipping in hot water at 80° C. for 280 hours | 0 | 0 | 0 | 0 | 100 |
| (Compounding formulation IV, top coat B) | | | | | |
| Initial | 100 | 0 | 60 | 100 | 70 |
| After dipping in hot water at 80° C. for 70 hours | 60 | 0 | 10 | 20 | 60 |
| After dipping in hot water at 80° C. for 140 hours | 30 | 0 | 0 | 0 | 60 |
| After dipping in hot water at 80° C. for 280 hours | 0 | 0 | 0 | 0 | 50 |
| [Acrylic rubber] (Compounding formulation V, top coat A) | | | | | |
| Initial | 100 | 100 | 60 | 100 | 100 |
| After dipping in hot water at 80° C. for 70 hours | 100 | 40 | 40 | 60 | 100 |
| After dipping in hot water at 80° C. for 140 hours | 90 | 10 | 40 | 40 | 100 |
| After dipping in hot water at 80° C. for 280 hours | 60 | 0 | 10 | 20 | 100 |
| [Chloroprene rubber] (Compounding formulation VI, top coat B) | | | | | |
| Initial | 100 | 0 | 60 | 100 | 60 |
| After dipping in hot water at 80° C. for 70 hours | 40 | 0 | 10 | 20 | 50 |
| After dipping in hot water at 80° C. for 140 hours | 10 | 0 | 0 | 0 | 40 |
| After dipping in hot water at 80° C. for 280 hours | 0 | 0 | 0 | 0 | 30 |

Comparative Example 6

| | Parts by weight |
|---|---|
| γ-aminopropyltriethoxysilane (monomer) | 1.3 |
| Vinyltriethoxysilane (monomer) | 1.3 |
| Titanium tetra(acetylacetonate) | 1.0 |
| Methanol | 86.4 |
| Water | 10.0 |

The foregoing components were mixed together and stirred for several minutes to prepare a primer for vulcanization bonding.

The primer for vulcanization bonding was applied to a defatted SUS304 test piece, air dried at room temperature and then subjected to a baking treatment at 190° C. for 10 minutes.

Comparative Example 7

In Comparative Example 6, after the baking treatment of the primer for vulcanization bonding onto the test piece, the test piece was cooled and a vulcanization adhesive C (Metaloc ZN-870) was applied to the test piece as a top coat, air dried at room temperature, and subjected to a baking treatment at 150° C. for 10 minutes.

Comparative Example 8

| | Parts by weight |
|---|---|
| γ-aminopropyltriethoxysilane (monomer) | 2.7 |
| Vinyltriethoxysilane (monomer) | 2.7 |
| Diisopropoxy aluminum ethylacetoacetate | 0.2 |
| Methanol | 94.8 |

The foregoing components were mixed together and stirred for several minutes to prepare a primer for vulcanization bonding.

The primer for vulcanization bonding was applied to a defatted SUS304 test piece, air dried at room temperature, and subjected to a baking treatment at 190° C. for 10 minutes.

Comparative Example 9

In Comparative Example 8, after the baking treatment of the primer for vulcanization bonding onto the test piece, the test piece was cooled, and a vulcanization adhesive C (Metaloc XN-870) was applied to the test piece as a top coat, air dried at room temperature, and subjected to a baking treatment at 150° C. for 10 minutes.

Unvulcanized fluoroelastomer compound (the afore-mentioned compounding formulation I) was placed onto each of the baked test pieces obtained in the foregoing Comparative Examples 6 to 9, and subjected to press vulcanization at 180° C. for 6 minutes to obtain adhesion test pieces. The adhesion test pieces were subjected to determination of percent retained rubber area (%) by a method according to JIS K-6256 90° peeling test procedure. The results are shown in the following Table 3.

TABLE 3

| | Comparative Example No. | | | |
|---|---|---|---|---|
| Time of determination | 6 | 7 | 8 | 9 |
| [Fluoroelastomer] | | | | |
| Initial | 90 | 100 | 80 | 100 |
| After dipping in hot water at 80° C. for 70 hours | 30 | 80 | 20 | 70 |
| After dipping in hot water at 80° C. for 140 hours | 0 | 60 | 0 | 50 |
| After dipping in hot water at 80° C. for 280 hours | 0 | 20 | 0 | 20 |

INDUSTRIAL UTILITY

The present primer for vulcanization bonding can give a metal-rubber composite having a water-resistant adhesiveness equivalent or superior to that of coating type chromate processing agent and thus can be effectively used in the surface treatment of metal such as stainless steel, etc. for production of seal products of rubber-bonded metal (e.g. oil seals, packings and gaskets), valves, vibration-controlled or vibration-damped products (e.g. vibration-controlled steel sheets and vibration-damped rubber), industrial rubber products, etc.

The invention claimed is:

1. A primer for vulcanization bonding for use as an under coat for a vulcanization adhesive for rubber in vulcanization bonding of stainless steel to rubber, witch comprises 100 parts by weight of copolymerization oligomer of amino group-containing alkoxysilane and vinyl group-containing alkoxysilane, and 40 to 80 parts by weight of an organometallic compound, the primer being prepared as a solution in an alcoholic organic solvent or a mixture of an alcoholic organic solvent and water.

2. A primer for vulcanization bonding according to claim 1, wherein the oligomer is obtained by copolymerization of 100 parts by weight of amino group-containing alkoxysilane and 25 to 400 parts by weight of vinyl group-containing alkoxysilane.

3. A stainless steel-rubber composite for use requiring a water-resistant adhesiveness, which comprises a stainless steel and rubber, both being vulcanization bonded through a primer for vulcanization bonding according to claim 1 as an under coat and a vulcanization adhesive for rubber as a top coat.

* * * * *